United States Patent
Yang

(10) Patent No.: US 7,130,202 B2
(45) Date of Patent: Oct. 31, 2006

(54) UNINTERRUPTED POWER SUPPLY AND THE METHOD FOR DRIVING ITS CONVERTERS

(75) Inventor: Gege Yang, Shenzhen (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 30 days.

(21) Appl. No.: 10/502,917

(22) PCT Filed: Jan. 28, 2003

(86) PCT No.: PCT/CN03/00092

§ 371 (c)(1),
(2), (4) Date: Sep. 24, 2004

(87) PCT Pub. No.: WO03/075428

PCT Pub. Date: Sep. 12, 2003

(65) Prior Publication Data

US 2005/0052084 A1    Mar. 10, 2005

(30) Foreign Application Priority Data

Jan. 28, 2002    (CN) .............................. 02 1 14814

(51) Int. Cl.
*H02M 1/12* (2006.01)
(52) U.S. Cl. ................... 363/44; 363/97; 363/16; 307/66
(58) Field of Classification Search ............ 363/34, 363/37, 89, 97, 90, 81, 44, 16, 56; 323/222, 323/207; 307/64, 65, 66

See application file for complete search history.

(56) References Cited

U.S. PATENT DOCUMENTS

| 4,823,247 A | 4/1989 | Tamoto |
| 4,980,812 A | 12/1990 | Johnson, Jr. et al. |
| 5,278,489 A | 1/1994 | Bowers |
| 5,684,686 A * | 11/1997 | Reddy ........................ 363/97 |
| 6,069,412 A | 5/2000 | Raddi et al. |

OTHER PUBLICATIONS

'Input Current Ripple Cancellation in Synchronized, Parallel Connected Critically Continuous Boost Converters' Michael S. Elmore, Celestica Power Systems, Endicott, NY, 1996 IEEE, pp. 152-158.

(Continued)

*Primary Examiner*—Rajnikant B. Patel
(74) *Attorney, Agent, or Firm*—Ladas & Parry LLP

(57) ABSTRACT

This invention relates to a method for driving converts of an uninterrupted power supply (UPS), characterized in that the generating circuit of driving signal for power factor correction generates two driving signals (DRV1, DRV2) to drive the switch transistors (Q9, Q11) of the positive and negative power factor correction branch respectively, the holding and shifting circuit of driving pulse-width after the generating circuit of driving signal for power factor correction holds and shifts the pulse-width of the two driving signals, and drives the switch transistors (Q10, Q12) parallel to the aforesaid switch transistors in the positive and negative power factor correction branch respectively. Since a circuit for holding the pulse-width is introduced, the currents of the switch transistors of the two parallel boost converters are maintained substantially the same, thereby improving the reliability of the uninterrupted power supply system. As a result, this invention can be widely used in any application where a UPS is desired.

8 Claims, 3 Drawing Sheets

OTHER PUBLICATIONS

'Power-Factor Correction with Interleaved Booost Converters in Continuous-Inductor-Current Mode' Balogh et al., 1993 IEEE, pp. 168-174.

'Double PWM Control for Unity-Power-Factor Converters' Ohnuki et al., Tokyo Denki University, Department of Applied Electronic Engineering, Japan, pp. 1-7.

* cited by examiner

UNINTERRUPTED POWER SUPPLY AND THE METHOD FOR DRIVING ITS CONVERTERS

TECHNICAL FIELD

The present invention relates to an uninterrupted power supply (UPS) and a method for driving its converters. More particularly, it relates to an uninterrupted power supply having a power factor correction (PFC) circuit and symmetrical converts connected in parallel and a method for driving such converters.

BACKGROUND OF THE INVENTION

Recently, an UPS of three-phase four-wire high-frequency link has been proposed in some controlling strategies, which include peak value current control and mean value current control, etc. With such improved controlling strategies, the content of the quintic or septic harmonic waves and the like can be significantly reduced. Although these controlling strategies may effectively improve the input power factor, they have their respective drawbacks. In case of the peak value current controlling strategy, the wave shapes of the three-phase input currents are different from each other, and the overall current of the harmonic waves is large. The mean value controlling strategy is widely used and has a smaller overall current of the harmonic waves in comparison with the peak value controlling strategy. However, a drawback of this strategy is that the input voltage is restricted and the switching frequency cannot exceed 20 KHz in high power applications.

FIG. 1 shows an uninterrupted power supply system using a mean value injection control, which comprises AC input ends U, V and W, a rectifying circuit, a battery branch, a power factor correction branch and an inverter branch. The input end of the rectifying circuit is connected with the AC input ends U, V and W, while the input end of the inverter branch is connected in parallel with the positive and negative ends on the DC side of the power factor correction branch. The power factor correction branch is placed between the battery branch and the inverter branch, and it includes a positive and negative boost converter circuit, a generating circuit of driving signals for power factor correction and positive and negative DC bus capacitors C1 and C2. The positive and negative boost converters include inductors L1, L2, L4 and L5, forward diodes D1 and D4, and positive and negative boost converter switch tubes Q9–Q12 respectively. The inductors L1, L2, L4 and L5 of the positive and negative boost converters are connected in series with the diodes D1–D4 respectively on the positive and negative DC bus. The positive DC bus capacitor C1 and the positive boost converter switch tubes Q9 and Q10 are cross-connected on the positive DC bus and the neutral line and placed before and after the diode D1 of the positive boost converter respectively. The negative DC bus capacitor C2 and the negative boost converter switch tubes Q11 and Q12 are cross-connected on the negative DC bus and the neutral line, and placed before and after the diode D4 of the negative boost converter. The input ends of the generating circuit of driving signals for power factor correction are connected with the positive and negative output voltage sampling signals REC1 and REC2 after the input voltage is rectified, the feedback signals V1 and V2 of the positive and negative DC bus capacitor voltage, and the sampling signals I1 and I2 of the induced current of the positive and negative boost converter respectively, while its output ends are connected with the control ends of the switch tubes Q9 and Q11 of the positive and negative boost converter. The positive and negative boost converter is formed with two symmetrical boost converter circuits in parallel, each of which includes an inductor (L1 or L2 or L4 or L5), a forward diode (D1 or D2 or D3 or D4) and a switch tube (Q9 or Q10 or Q11 or Q12). A driving signal shifting circuit is provided after the generating circuit of driving signal for power factor correction for regulating the phase of the driving signal. The signals from its input end and output end are sent to the controlling ends of a first positive boost converter switch tube (Q9), a first negative boost converter switch tube (Q11), and a second positive boost converter switch tube (Q10), a second negative boost converter switch tube (Q11), respectively.

However, there is only replacement without holding the width of the Pulse it may result in uneven current of those two voltage increase converters, and thus the system reliability is low.

SUMMARY OF THE INVENTION

An object of the present invention is to solve the aforesaid problems by providing an uninterrupted power supply having symmetrical converters connected in parallel, and a method for driving the converters, thereby improving the uniform current in the system.

Another object of the present invention is to increase the capability of dynamic response of the system.

The other object of the present invention is to increase the input voltage range.

To realize the above objects, the present invention provides an uninterrupted power supply having symmetrical converts in parallel and a method for driving the converters.

An uninterrupted power supply comprises an AC input end, a rectifying circuit, a battery branch, a power factor correction branch and an inverter branch, wherein an input end of the rectifying circuit is connected with the AC input end, the battery branch is connected in parallel with the positive and negative ends of the rectifying circuit on the side of DC output, an input end of the inverter branch is connected in parallel with the positive and negative ends of the power factor correction branch on the DC output side, the output of the inverter branch is a single-phase AC-output, and the power factor correction branch is placed between the battery branch and the inverter branch. The uninterrupted power supply is characterized in that the power factor correction branch includes two positive boost converters connected in parallel, two negative boost converters connected in parallel, a driving signal generating circuit of power factor correction, as well as a holding and shifting circuit of driving pulse-width, wherein the positive and negative boost converters have a switch transistor respectively, the holding and shifting circuit of driving pulse-width is placed after the generating circuit of driving signal of power factor correction, and the signals from its input and output ends are connected, respectively, to the control ends of the switch transistors of the positive boost converters or the negative boost converters.

A method for driving the converters of an uninterrupted power supply is suitable for an uninterrupted power supply having a power factor correction branch comprising two symmetrical positive and negative boost converters connected in parallel, wherein a driving signal generating circuit of the power factor correction branch generates two driving signals to drive a first and a second switch transistors in the positive and negative power factor correction branch respectively, a holding and shifting circuit of driving pulse-width is placed after the generating circuit of driving signal of power factor correction to holding and shift the pulse-width, and to drive a third and a fourth switch transistors connected in parallel With the first and the second switch transistors of the positive and negative power factor correction branch respectively.

In the uninterrupted power supply of the present invention, the circuits of the positive boost converters parallel to each other in the power factor correction branch have an inductor respectively, wherein one of the inductors is connected with the current input end of the generating circuit of driving signal of power factor correction, and the circuits of the negative boost converters in the positive and negative power factor correction branch have an inductor respectively, wherein one of the inductors is connected with the current input end of the generating circuit of driving signal of power factor correction.

The present invention further comprises a DC power supply and a pair of change-over switches. The change-over switches are placed between the generating circuit of driving signal of power factor correction and the output ends of the positive and negative voltage after the input voltage is rectified, and are connected with the voltage input ends of the generating circuit of driving signal of power factor correction, the output ends of the rectified positive and negative voltage, and the DC output end, respectively.

With the aforesaid solution that introduces a pulse-width maintaining circuit, the present invention can keep the currents of the switch transistors of the two parallel boost converters substantially the same, thereby improving the reliability of the system.

Further, the sampling signals of the induced currents of the positive and negative boost converters in the power factor correction branch come from one of the inductors in the parallel positive boost converters and one of the inductors in the parallel negative boost converters respectively, rather than sampling the overall current of the two parallel inductors, thereby allowing the electric current loop to work in a single boost converter situation. As a result, the bandwidth of the system can be increased, and the transient response to output voltage can be significantly improved as well. In case the DC power supply and the change-over switches are further provided, the input voltage range can be increased.

DETAILED DESCRIPTION OF THE INVENTION

The present invention is described below in detail in conjunction with the embodiment and the accompanying drawings.

Figure 1:
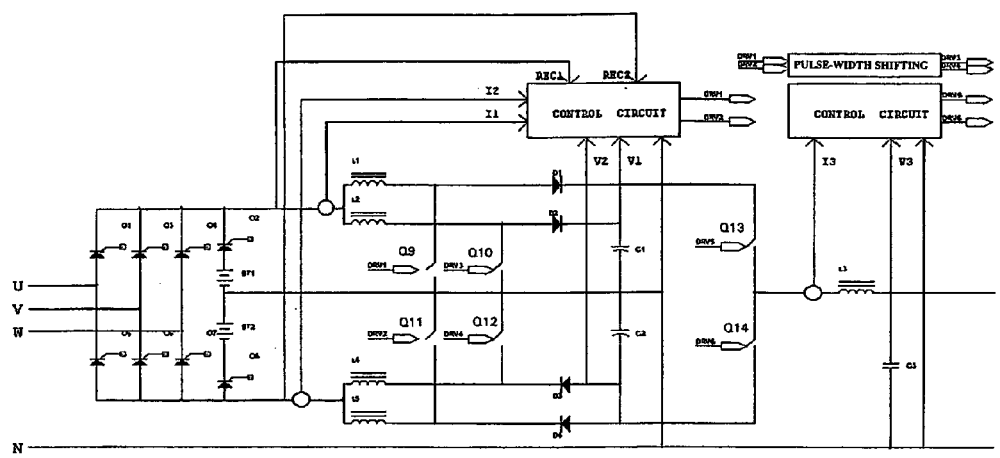
FIG. 1 is a circuit diagram of the prior art.
Figure 2:
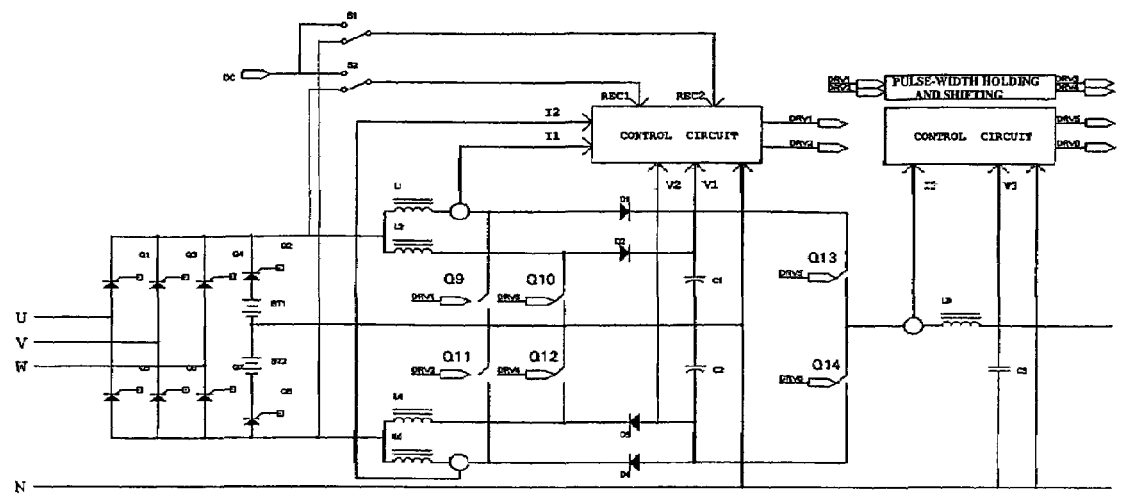
FIG. 2 is a circuit diagram in accordance with an embodiment of the present invention.

FIG. 2 shows an embodiment of the present invention, and the basic principle thereof is similar with that illustrated in FIG. 1. It achieves the high quality input current waveform and reduces the input harmonic current by detecting the induced current signals, and forward-feeding the voltage waveform after the rectification bridge, that is, the positive and negative voltage output sampling signals (REC1, REC2) after the voltage is rectified. The circuit construction is similar to that of the conventional mean value controlling technology, which can be referred to as mean value current injection control method. This method can be a single-phase mean value current injection control or a three-phase mean value current injection control where the rectifying circuit and AC input end are three-phase four-wire systems. The present invention takes the three-phase AC input end as an example. As shown in FIG. 2, in case of the mean value control circuit (other forms of control circuit can be used as well), the sampling signals of the induced currents (I1, I2) of the positive and negative boost converters, the sampling signals of the positive and negative output voltage (REC1, REC2) after the input voltage is rectified, and the feedback voltage signals (V1, V2) of the capacitors of the positive and negative DC bus generates two driving signals (DRV1, DRV2) through the generating circuit of driving signal of power factor correction to drive the positive and negative boost converters respectively.

Figure 3:
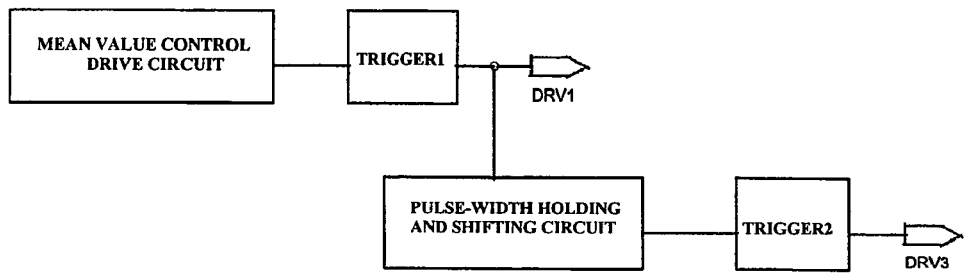
FIG. 3 is a block diagram showing the pulse-width holding and shifting circuit in accordance with the embodiment of the present invention.
Figure 4:
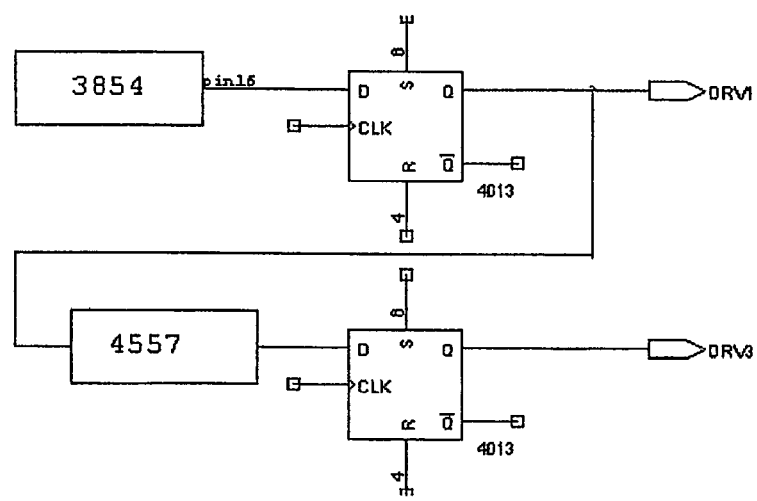
FIG. 4 is a circuit diagram showing the pulse-width holding and shifting circuit in accordance with the embodiment of the present invention.

As shown in FIG. 2, compared with FIG. 1, the uninterrupted power supply in accordance with the present invention provides two symmetrical boost circuits in parallel. In addition, a control circuit includes a maintaining and shifting circuit for the pulse-width of the driving signals that maintains and shifts the pulse-width of the above-mentioned two driving signals (DRV1, DRV2). In other words, the holding and shifting circuit regulates the phases of the two driving signals (DRV1, DRV2) and holds their pulse-width. Therefore, not only the frequency doubling of the switching frequency can be easily realized and the ripple current of the capacitors of the DC bus can be significantly reduced, but also the currents of the switch transistors of the two parallel boost converters can be kept the same, thereby improving the reliability of the system. This is realized by sending the two driving signals (DRV1, DRV2) to the driving pulse-width holding and shifting circuit to generate other two driving signals (DRV3, DRV4) that have the same pulse-width and adjustable phases. The other two driving signals are used to drive other two symmetrical boost converters connected in parallel with the aforesaid positive and negative boost converters. In particular, it is realized by providing a driving pulse-width holding and shifting circuit, as illustrated in FIG. 3 and FIG. 4, after the generating circuit of driving signal of power factor correction to holding the pulse-width of the driving signals and regulate their phases. The signals from their input ends and output ends are sent to the control ends of the switch transistor of the first positive boost converter (Q9), the switch transistor of the first negative boost converter (Q11), the switch transistor of the second positive boost converter (Q10) and the switch transistor of the second negative boost converter (Q12), respectively.

Now referring to FIG. 4, 3854 indicates UC3854, which is a mean value controlling chip in the mean value control circuit. 4557 indicates MC4557, which is a shift register in the holding and shifting circuit of the pulse-width of the driving signal. 4031 indicates CD4031, which is a D trigger.

Other features of the present invention are as follows: the feedforward voltage of the mean value control circuit is not connected with the waveform of the rectified three-phase commercial power, i.e., the sampling signals of the positive and negative output voltage (REC1, REC2) after the input voltage is rectified. In fact, it switches between the wave-forms of the rectified three-phase commercial power and the DC voltage. This is realized by the following circuit as illustrated in FIG. 2, i.e., adding a DC voltage and a pair of change-over switches (S1, S2). The change-over switches have their respective one end that can switch between the sampling signal of the positive and negative output voltage (REC1, REC2) after the input voltage is rectified and the DC voltage, and have their respective other end as a common end, which is connected to the input end of the generating circuit of driving signal of power factor correction. The advantages of such a circuit are as follows: when the three-phase commercial power is normal, the control circuit feedforwards the rectified voltage of the commercial power to allow the waveform of the input current to follow the waveform of the rectified voltage, thereby minimizing the input harmonic current; while the input voltage is too low or lacks phase (lacks one phase or two phases), the mean value control circuit cannot operate steadily. The switches (S1, S2) are then switched to the feedforward DC voltage. Here the input current is a square wave current. Although the harmonic current is large, the range of the input voltage is greatly increased with this method. In comparison with the prior art, the present invention provides another feature wherein the sampling signals of the induced current (I1, I2) of the positive and negative boost converters come from one of the induced currents (one from L1 or L2, and one from L3 or L4), rather than from the overall induced current. As a result, the amplification of the current loop can be reduced, thereby increasing the bandwidth of the current loop and improving the transient response time of the system.

In FIG. 2, the switch transistors (Q13, Q14) and the inductor (L13) form an inverter, which performs the DC-AC converting and generates AC output voltage (V3) of a stable voltage and frequency. The driving signal (DRV 5) is used to drive the switch transistor of the inverter (Q13), while the driving signal (DRV 6) is used to drive the switch transistor of the inverter (Q14). V3 is the feedback of the invert output voltage, while I3 is the sampling of the induced current of the inverter.

While the present invention is described with the above embodiment, it will be obvious to those skilled in the art may that many modifications and implementations are possible that are still within the spirit and the scope of the invention.

The invention claimed is:

1. An uninterrupted power supply, comprising an AC input end; a rectifying circuit; a battery branch; a power factor correction branch; and an inverter branch, wherein an input end of said rectifying circuit is connected with said AC input end, said battery branch is connected in parallel with positive and negative ends of said rectifying circuit on a DC output side, an input end of said inverter branch is connected in parallel with positive and negative ends of said power factor correction branch on the DC output side, an output end of said inverter branch is a single-phase AC output, and said power factor correction branch is placed between said battery branch and said inverter branch, characterized in that said power factor correction branch includes two positive boost converters connected in parallel, two negative boost converters connected in parallel, a generating circuit of driving signal of power factor correction, and a holding and shifting circuit of driving pulse-width, wherein said positive and negative boost converters have a switch transistor respectively, said holding and shifting circuit of driving pulse-width being placed after the generating circuit of driving signal of power factor correction, and the signals from its input and output ends being connected to the control ends of the switch transistors of said positive boost converters or the switch transistors of said negative boost converters.

2. The uninterrupted power supply of claim 1, characterized in that the circuits of the positive boost converters parallel to each other in said power factor correction branch have an inductor respectively, wherein one of the inductors is connected with the current input end of said generating circuit of driving signal of power factor correction, and the circuits of the negative boost converters in said power factor correction branch have an inductor respectively, wherein one of the inductors is connected with the current input end of said generating circuit of driving signal of power factor correction.

3. The uninterrupted power supply of claim 1 or claim 2, further comprising a DC power supply and a pair of change-over switches, said change-over switches being placed between the generating circuit of driving signal of power factor correction and the output ends of the positive and negative voltage after the input voltage is rectified, and connected with the voltage input ends of said generating circuit of driving signal of power factor correction, the output ends of the rectified positive and negative voltage, and the DC output end respectively.

4. The uninterrupted power supply of claim 3, characterized in that when the input voltage is normal, the input ends of said generating circuit of driving signal of power factor correction are connected with the output ends of the rectified positive and negative voltage through said change-over switches, and switched to said DC power supply while the input voltage is too low or lacks phases.

5. A method for driving converters of an uninterrupted power supply adopted for an uninterrupted power supply system having a power factor correction branch comprising two symmetrical positive and negative boost converters in parallel, characterized in that a driving signal generating circuit of said power factor correction branch generates two driving signals to drive a first and a second switch transistors in the positive and negative power factor correction branch respectively, a holding and shifting circuit of driving pulse-width after said generating circuit of driving signal of power factor correction holds and shifts the pulse-width of the two driving signals, and drives a third and a fourth switch transistors parallel to the first and the second switch transistors in said positive and negative power factor correction branch respectively.

6. The method for driving converters of an uninterrupted power supply of claim 5, characterized in that sampling signals of induced currents of the positive and negative boost converters in said positive and negative power factor correction branch come from one of the inductors in said positive boost converters parallel to each other, and one of the inductors in said negative boost converters parallel to each other respectively.

7. The method for driving converters of an uninterrupted power supply of claim 5 or claim 6, characterized in that the voltage input signal of said generating circuit of driving signal for power factor correction can be switched between the sampling signal of the positive and negative output voltage after the input voltage is rectified and the DC voltage.

8. The method for driving converters of an uninterrupted power supply of claim 7, characterized in that when the input voltage is normal, the voltage input signal of said generating circuit of driving signal of power factor correction comes from the sampling signal of the positive and negative output voltage after the input voltage is rectified; and the input ends of said generating circuit of driving signal of power factor correction are switched to said DC voltage when the input voltage is too low or lacks phases.

* * * * *